United States Patent [19]

Bacha et al.

[11] 3,843,709

[45] Oct. 22, 1974

[54] PREPARATION OF CYCLOPROPYL CYANIDE FROM 4-CHLOROBUTYRONITRILE

[75] Inventors: John D. Bacha; Charles M. Selwitz, both of Monroeville, Pa.

[73] Assignee: Gulf Research & Development Company, Pittsburgh, Pa.

[22] Filed: Oct. 15, 1973

[21] Appl. No.: 406,294

[52] U.S. Cl............ 260/464, 260/514 H, 260/557 R
[51] Int. Cl.................. C07c 121/02, C07c 121/46
[58] Field of Search..................................... 260/464

[56] References Cited
OTHER PUBLICATIONS

Cloke, et al., J.A.C.S., 53, (1931) pp. 2791–2792.
Kittila, D.M.F., (1967), DuPont Publication, p. 42.

*Primary Examiner*—Joseph Paul Brust

[57] ABSTRACT

Cyclopropyl cyanide is prepared by reacting 4-chlorobutyronitrile with a base in the presence of a polar, aprotic solvent. For example, the reaction of 4-chlorobutyronitrile with sodium hydroxide in the presence of dimethyl sulfoxide produces cyclopropyl cyanide in high yield.

10 Claims, No Drawings

PREPARATION OF CYCLOPROPYL CYANIDE FROM 4-CHLOROBUTYRONITRILE

This invention relates to a method of making cyclopropyl cyanide. More particularly this invention relates to a method of making cyclopropyl cyanide in good yield by the reaction of 4-chlorobutyronitrile with a base in the presence of a polar, aprotic solvent.

Cyclopropyl cyanide has been made from the reaction of 4-chlorobutyronitrile with sodamide in liquid anhydrous ammonia at a maximum yield of about 60 percent. We have discovered that 4-chlorobutyronitrile can be converted to cyclopropyl cyanide using an inexpensive base such as sodium hydroxide and a polar, aprotic solvent in a convenient and economical process. For example, in using sodium hydroxide, cyclopropyl cyanide has been obtained by us in a yield as high as about 100 percent. This high yield of cyclopropyl cyanide by reaction with the hydroxide without substantial hydrolysis of the nitrile function is surprising. It has been shown that substantial yields of the hydrolysis products, cyclopropanecarboxamide and cyclopropanecarboxylic acid, are obtained when cyclopropyl cyanide and sodium hydroxide are reacted. These hydrolysis products substantially reduce the overall yield of the desired cyclopropyl cyanide. Cyclopropyl cyanide can be hydrogenated, using a conventional hydrogenation catalyst, to cyclopropylcarbinylamine which is useful in the preparation of herbicides.

Our invention is based on the discovery that 4-chlorobutyronitrile can be reacted with a suitable base in the presence of a polar, aprotic solvent to effect ring closure at a high yield of cyclopropyl cyanide. The use of the polar, aprotic solvent is of critical significance in obtaining the high yields of our invention.

Useful polar, aprotic solvents include the sulfoxides, the sulfones, the di-N-substituted carboxylic acid amides, the N-substituted pyrrolidones, and the like. The sulfoxides are defined by the formula $R_1(R_2)S:O$ in which $R_1$ and $R_2$ are independently selected from lower alkyl, phenyl and benzyl and chlorine substituted derivatives thereof. Dimethyl sulfoxide is the preferred sulfoxide. Also useful are diethyl sulfoxide, di-n-propyl sulfoxide, di-n-butyl sulfoxide, di-2-chloroethyl sulfoxide, diphenyl sulfoxide, methyl phenyl sulfoxide, benzyl phenyl sulfoxide, dibenzyl sulfoxide, and the like. The sulfones are defined by the formula $R_3(R_4)SO_2$ in which $R_3$ and $R_4$ are independently selected from lower alkyl and can be joined together to form a cyclic compound having from three to eight members in the ring. Sulfolane also known as tetramethylene sulfone is the preferred sulfone. Also useful are dimethyl sulfone, diethyl sulfone, trimethylene sulfone, pentamethylene sulfone, hexamethylene sulfone, and the like.

The di-N-substituted carboxylic acid amides are defined by the formula $R_5CONR_6(R_7)$ in which $R_5$ is hydrogen or lower alkyl and $R_6$ and $R_7$ are independently lower alkyl. Preferred di-N-substituted carboxylic acid amides are dimethyl formamide and dimethyl acetamide. Also useful are diethyl formamide, diethyl acetamide, di-n-propyl acetamide, di-t-butyl acetamide, dimethyl butyramide, dimethyl propionamide, and the like. The useful N-substituted pyrrolidones include the N-lower alkyl alpha and beta pyrrolidones. Preferred are N-methyl pyrrolidone and N-ethyl pyrrolidone. Other polar, aprotic solvents are useful herein such as hexamethylenephosphoramide and the like. As used herein, lower alkyl includes alkyl groups having from one to about four carbon atoms. Suitable mixtures of two or more polar, aprotic solvents can also be used.

Any alkali metal hydroxide or lower alkoxide; or calcium, barium or strontium oxide or hydroxide; or magnesium oxide, hydroxide or lower alkoxide; or a mixture thereof can be used as the base for reaction with the 4-chlorobutyronitrile. We prefer sodium hydroxide. Although we mean to include lithium, sodium, potassium, rubidium and cesium as alkali metals herein, we prefer the first three members of the group and particularly sodium due to availability and moderate cost. The alkoxides have from one to about four carbon atoms and include the methoxide, ethoxide, propoxide, t-butoxide, and the like.

The reaction of the base with the 4-chlorobutyronitrile is a liquid phase reaction carried out in the polar, aprotic solvent. This requires that the base and the solvent be suitably selected to insure that the base which is used is sufficiently soluble in the desired polar, aprotic solvent to effect reaction at a suitable rate.

The temperature for carrying out the reaction is not critical. At too low a temperature the reaction occurs at an impractical rate, while at too high a temperature undesired decomposition becomes important. Since the reaction rate increases as the temperature increases, an elevated temperature can in many instances be advantageously employed. Also, an elevated temperature may be preferred with certain combinations of base and polar, aprotic solvent to increase the solubility of the base in the solvent. In view of this, we find that a broad temperature range of about 0° to about 160° C. is useful. However, we prefer a temperature within the range of about 15° to about 145° C. and most prefer a temperature within the range of about 25° to about 125° C. The reaction can be carried out at atmospheric pressure or at lower or higher pressures. We prefer to use atmospheric pressure or pressures lower than atmospheric.

The relative proportion of the 4-chlorobutyronitrile, the base and the polar, aprotic solvent that is used is not critical to obtaining reaction. However, we have found that the reaction can be run at greater efficiency when the amount of these materials is controlled within specified ranges. Thus, we have found that a molar ratio of the base of the 4-chlorobutyronitrile of about 0.5:1 to about 2:1 is desirable with a ratio of about 1:1 to about 1.5:1 being preferred. In like manner we have found that a volume ratio of polar, aprotic solvent to 4-chlorobutyronitrile of about 1:1 to about 100:1 is desirable with a volume ratio of about 5:1 to about 50:1 being preferred. Also we have found that a ratio of polar, aprotic solvent in liters to base in mols of about 0.05:1 to about 20:1 is desirable with about 0.3:1 to about 5:1 being preferred.

The reaction of the 4-chlorobutyronitrile and the base in the polar, aprotic solvent can be conveniently carried out in a batch operation particularly when large quantities are not required. When conducted batch-wise, it is preferred to carry out the reaction until substantially no 4-chlorobutyronitrile is left in the reactor to avoid any need for reactant recovery and recycle steps. The reaction can also be carried out as a continuous reaction by introducing the reactants and the polar, aprotic solvent into an elongated reactor and maintaining the reaction temperature as the reaction mixture progresses to the outlet. In this continuous procedure the reaction can be carried out at partial conversion with somewhat improved efficiency and with recycle of unreacted 4-chlorobutyronitrile.

The following examples are set out to illustrate the novel process of the invention and to provide a better understanding of its details and advantages.

EXAMPLE 1

A mixture of 22.5 mmols of powdered sodium hydroxide and 50 ml. of dimethyl sulfoxide was heated with stirring in a 100 ml. flask at 104° C. A solution of 17.4 mmols of 4-chlorobutyronitrile in 20 ml. of dimethyl sulfoxide was added dropwise in about 20 minutes. Stirring was continued at a temperature of about 104° C. for about 1 hour. Analysis of the reaction product mixture disclosed 100 percent conversion of the 4-chlorobutyronitrile with a yield of cyclopropyl cyanide of about 100 percent.

EXAMPLE 2

A mixture of 17.8 mmols of powdered sodium hydroxide and 50 ml. of dimethyl sulfoxide was heated with stirring in a 100 ml. flask at 99° C. A solution of 17.4 mmols of 4-chlorobutyronitrile in 20 ml. of dimethyl sulfoxide was added dropwise in about 20 minutes. Stirring was continued at a temperature of about 99° C. for about 10 minutes. Analysis of the reaction product mixture disclosed about 90 percent conversion of the 4-chlorobutyronitrile with a yield of cyclopropyl cyanide of 88.4 percent.

EXAMPLE 3

A mixture of 21.4 mmols of powdered sodium hydroxide and 50 ml. of dimethyl sulfoxide was heated with stirring in a 100 ml. flask at 99° C. A solution of 17.4 mmols of 4-chlorobutyronitrile in 20 ml. of dimethyl sulfoxide was added dropwise in about 20 minutes. Stirring was continued at a temperature of about 99° C. for about 10 minutes. Analysis of the reaction product mixture disclosed 100 percent conversion of the 4-chlorobutyronitrile with a yield of cyclopropyl cyanide of 98.3 percent.

EXAMPLE 4

A 170 ml. portion of dimethyl sulfoxide was added to 0.112 mol of powdered sodium hydroxide in a 500 ml. flask and heated to 98° C. A mixture of 0.1 mol of 4-chlorobutyronitrile in a 30 ml. portion of dimethyl sulfoxide was added dropwise in about 25 minutes. Stirring was continued at 98° C. for an additional 25 minutes. Analysis disclosed that 70.8 percent of the 4-chlorobutyronitrile was converted at a yield of cyclopropyl cyanide of 67.3 percent and a conversion efficiency of 95.1 percent. In this example the ratio of dimethyl sulfoxide in ml. to sodium hydroxide in mmol was 1.8 and the ratio of dimethyl sulfoxide in ml. to 4-chlorobutyronitrile in mmol was 2 while the equivalent ratios in Example 1 were 3.1 and 4, respectively.

EXAMPLE 5

A mixture of 125 mmols of sodium hydroxide in the form of pea-size pellets, 70 ml. of dimethyl sulfoxide and 17.4 mmols of 4-chlorobutyronitrile was heated to 100° C. with stirring in a 100 ml. flask. After 3.8 hours, about 70 percent of the 4-chlorobutyronitrile was consumed with cyclopropyl cyanide constituting the sole product. Upon standing unstirred at 25°C. overnight, the remainder of the 4-chlorobutyronitrile was consumed with cyclopropyl cyanide being the sole product.

EXAMPLE 6

Example 5 was repeated except that the sodium hydroxide pellets were crushed to particles the size of coarse sand. All of the 4-chlorobutyronitrile was converted in 1.4 hours to cyclopropyl cyanide with a trace of cyclopropanecarboxamide detected by gas chromatography. The reaction mixture was permitted to stand at reaction temperature and the steady conversion of cyclopropyl cyanide to cyclopropanecarboxamide with time was noted.

EXAMPLE 7

Example 6 was repeated except that 20 mmols of the crushed sodium hydroxide pellets were used instead of 125 mmols. The reaction stopped after about 2 hours and 10 minutes at a conversion of less than 75 percent of the 4-chlorobutyronitrile and a yield of 57 percent cyclopropyl cyanide and a small amount of cyclopropanecarboxamide. Further, heating for about 3 hours and 45 minutes at 100° C. resulted in no increase in the conversion and no increase in the amount of cyclopropanecarboxamide.

EXAMPLE 8

A solution of 17.4 mmols of 4-chlorobutyronitrile in 20 ml. of dimethyl sulfoxide was added dropwise to a mixture of 17.2 mmols of powdered potassium hydroxide and 50 ml. of dimethyl sulfoxide in a 100 ml. flask. The potassium hydroxide contained about 15 percent water. The reaction mixture was heated at 100° C. and was stirred during the course of the reaction. After the addition was completed in 20 minutes, heating with stirring was continued for an additional 5 hours and 10 minutes. Analysis of the product mixture disclosed that the conversion of the 4-chlorobutyronitrile was greater than 90 percent at a yield of cyclopropyl cyanide of 72.5 percent.

EXAMPLE 9

The rate of cyclopropyl cyanide hydrolysis was qualitatively examined by heating a mixture containing 17.9 mmols of cyclopropyl cyanide, 70 ml. of dimethyl sulfoxide and 20 mmols of crushed sodium hydroxide pellets to 100° C. with stirring. After 6 hours and 20 minutes, 65 percent of the cyclopropyl cyanide was converted with cyclopropylcarboxamide being the principal product.

When 4-chlorobutyronitrile and sodium hydroxide are reacted in the absence of the above-named solvents, prior evidence indicates that the rates of formation of cyclopropyl cyanide and hydrolysis of the cyclopropyl cyanide to hydrolysis products are substantially similar. The above examples demonstrate that when the 4-chlorobutyronitrile and the hydroxide are reacted in a polar, aprotic solvent, the relative rates of the competing reactions are substantially modified in a favorable direction, that is, towards the preparation of the desired cyclopropyl cyanide rather than its hydrolysis products with a yield of about 100 percent cyclopropyl cyanide being attainable. The above examples also indicate that the relative proportions of constituents, the physical form of the base, the presence of water in the system, and the like, affect the overall yield of the cyclopropyl cyanide.

Cyclopropyl cyanide is prepared in like manner when 4-chlorobutyronitrile is reacted with sodium methoxide in the presence of dimethylformamide, when 4-chlorobutyronitrile is reacted with calcium hydroxide in the presence of sulfolane, when 4-chlorobutyronitrile is reacted with magnesium oxide in the presence of N-methyl pyrrolidone, when 4-chlorobutyronitrile is reacted with magnesium ethoxide in the presence of hexamethylenephosphoramide, when 4-chlorobutyronitrile is reacted with barium oxide in the presence of dimethylacetamide, and the like.

It is to be understood that the above disclosure is by way of specific example and that numerous modifications and variations are available to those of ordinary skill in the art without departing from the true spirit and scope of our invention.

We claim:

1. A method for preparing cyclopropyl cyanide which comprises reacting 4-chlorobutyronitrile with a base selected from alkali metal hydroxide or lower alkoxide having from one to about four carbon atoms; or calcium, barium or strontium oxide or hydroxide; or magnesium oxide, hydroxide or lower alkoxide having from one to about four carbon atoms; or a mixture thereof in a polar, aprotic solvent at a volume ratio of the polar, aprotic solvent to the 4-chlorobutyronitrile of between about 1:1 and about 100:1, a ratio of the polar, aprotic solvent in liters to the base in mols of between about 0.05:1 and about 20:1, and a molar ratio of the base to the 4-chlorobutyronitrile of between about 0.5:1 and about 2:1; and at a temperature between about 0° and about 160° C.

2. A method in accordance with claim 1 in which the polar, aprotic solvent is a sulfoxide defined by the formula $R_1(R_2)S{:}O$ in which $R_1$ and $R_2$ are independently lower alkyl, phenyl or benzyl, or a chlorine substituted derivative thereof; a sulfone defined by the formula $R_3(R_4)SO_2$ in which $R_3$ and $R_4$ are independently selected from lower alkyl and can be joined together in a cyclic compound having from three to eight members in the ring; a di-N-substituted carboxylic acid amide defined by the formula $R_5CONR_6(R_7)$ in which $R_5$ is H or lower alkyl and $R_6$ and $R_7$ are independently lower alkyl; an N-lower alkyl alpha or beta pyrrolidone; hexamethylenephosphoramide or a mixture thereof.

3. A method for preparing cyclopropyl cyanide in accordance with claim 1 in which the polar, aprotic solvent is dimethyl sulfoxide, dimethylformamide, dimethylacetamide or sulfolane.

4. A method in accordance with claim 1 in which the volume ratio of the polar, aprotic solvent to the 4-chlorobutyronitrile is between about 5:1 and about 50:1.

5. A method in accordance with claim 1 in which the ratio of the polar, aprotic solvent in liters to the base in mols is between about 0.3:1 and about 5:1.

6. A method in accordance with claim 1 in which the molar ratio of the base to the 4-chlorobutyronitrile is between about 1:1 and about 1.5:1.

7. A method in accordance with claim 1 in which the temperature is between about 15° and about 145° C.

8. A method in accordance with claim 1 in which the temperature is between about 25° and about 125° C.

9. A method for preparing cyclopropyl cyanide which comprises reacting 4-chlorobutyronitrile with sodium hydroxide in a solvent selected from dimethyl sulfoxide, dimethylformamide, dimethylacetamide or sulfolane at a volume ratio of the solvent to the 4-chlorobutyronitrile of between about 1:1 and about 100:1, a ratio of the solvent in liters to the sodium hydroxide in mols of between about 0.05:1 and about 20:1, and a molar ratio of the sodium hydroxide to the 4-chlorobutyronitrile of between about 0.5:1 and about 2:1; and at a temperature between about 0° and about 160°C.

10. A method in accordance with claim 9 in which the solvent is dimethyl sulfoxide and the temperature is between about 15° and about 145° C.

* * * * *